(12) United States Patent
Berzins et al.

(10) Patent No.: US 10,437,905 B2
(45) Date of Patent: Oct. 8, 2019

(54) UNIFORM RESOURCE LOCATOR COLLECTIONS

(71) Applicant: Accenture Global Solutions Limited, Dublin (IE)

(72) Inventors: Steven Berzins, Simpsonville, SC (US); Thomas A. Hsu, Bellaire, TX (US)

(73) Assignee: Accenture Global Solutions Limited, Dublin (IE)

( * ) Notice: Subject to any disclaimer, the term of this patent is extended or adjusted under 35 U.S.C. 154(b) by 357 days.

(21) Appl. No.: 15/093,136

(22) Filed: Apr. 7, 2016

(65) Prior Publication Data
US 2017/0102864 A1  Apr. 13, 2017

Related U.S. Application Data

(60) Provisional application No. 62/238,479, filed on Oct. 7, 2015.

(51) Int. Cl.
*G06F 16/955* (2019.01)
*G06Q 50/00* (2012.01)

(52) U.S. Cl.
CPC ......... *G06F 16/9562* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 6,408,316 B1 * | 6/2002 | Himmel | G06F 17/30884 707/999.01 |
| 8,577,868 B1 | 11/2013 | Zamir et al. | |
| 8,949,217 B2 | 2/2015 | Zhang et al. | |
| 9,442,903 B2 * | 9/2016 | Katic | G06F 16/957 |
| 9,965,541 B2 * | 5/2018 | Gadamsetty | G06F 16/285 |
| 2007/0159651 A1 * | 7/2007 | Disario | G06F 17/3028 358/1.15 |
| 2013/0046584 A1 * | 2/2013 | Yu | G06Q 10/06 705/7.38 |
| 2013/0080900 A1 * | 3/2013 | Wilde | G06F 17/30893 715/736 |
| 2014/0129942 A1 * | 5/2014 | Rathod | H04N 21/44222 715/720 |
| 2014/0195240 A1 * | 7/2014 | Laker | G06F 8/38 704/260 |
| 2016/0104067 A1 * | 4/2016 | Xu | G06F 17/30864 706/46 |

* cited by examiner

*Primary Examiner* — Beau D Spratt
(74) *Attorney, Agent, or Firm* — Harrity & Harrity, LLP

(57) ABSTRACT

A device may receive information associated with a collection including a set of uniform resource locators (URLs). The information associated with the collection may include a set of titles and a set of images corresponding to the set of URLs, and attribute information associated with the collection. The device may provide, for display to a user and based on the information associated with the collection, a collection user interface that includes the set of titles and the set of images, the attribute information, and one or more input elements associated with editing the information associated with the collection. The device may determine, based on user input via the one or more input elements, updated information associated with the collection, and may provide the updated information associated with the collection to allow the updated information associated with the collection to be provided for display to another user.

20 Claims, 16 Drawing Sheets

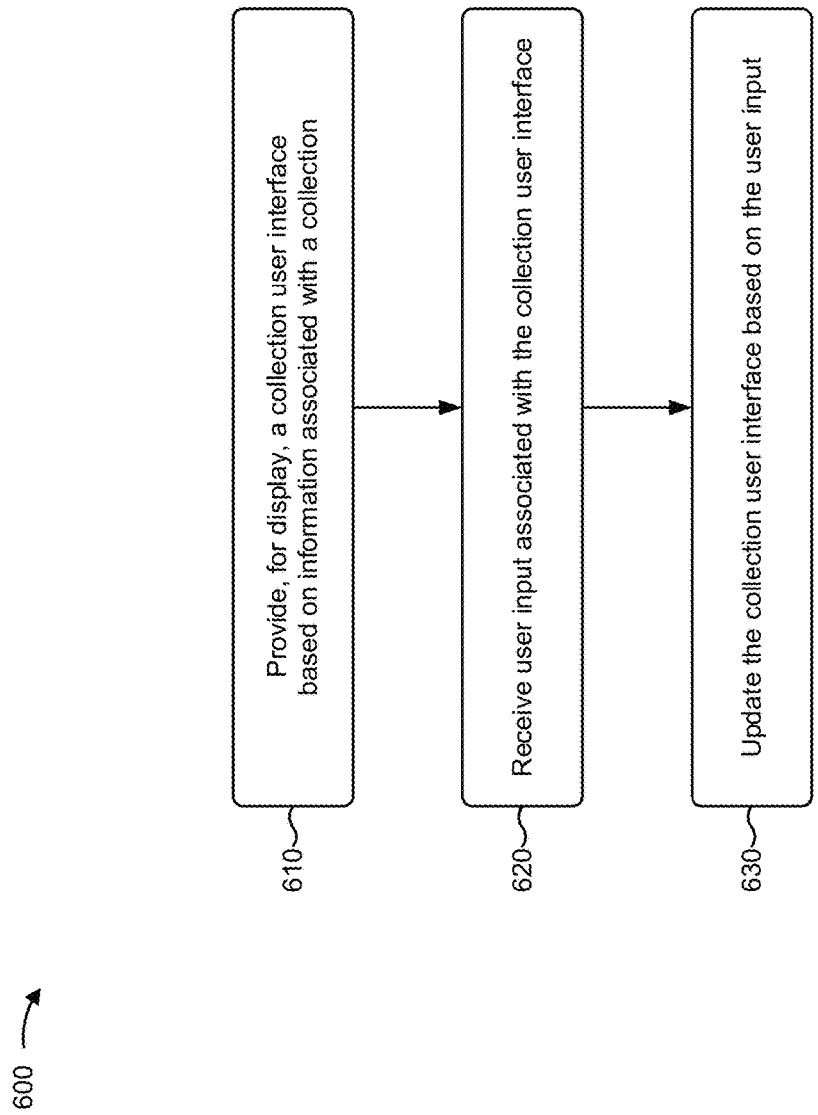

UNIFORM RESOURCE LOCATOR COLLECTIONS

RELATED APPLICATION

This application claims priority under 35 U.S.C. § 119 to U.S. Provisional Patent Application No. 62/238,479, filed on Oct. 7, 2015, the content of which is incorporated by reference herein in its entirety.

BACKGROUND

A Uniform Resource Locator (URL) is a reference to a resource that specifies both a location of the resource on a network and a mechanism for retrieving the resource. A user may view and/or access the resource based on the URL (e.g., via a browser window).

SUMMARY

According to some possible implementations, a method may include: receiving, by a device, information associated with a collection including a set of uniform resource locators (URLs), where the information associated with the collection may include a set of titles and a set of images corresponding to the set of URLs, and attribute information associated with the collection; providing, by the device and for display to a user, a collection user interface based on the information associated with the collection, where the collection user interface may include: the set of titles and the set of images corresponding to the set of URLs, the attribute information associated with the collection, and one or more input elements associated with editing the information associated with the collection; determining, by the device and based on user input via the one or more input elements, updated information associated with the collection; and providing, by the device, the updated information associated with the collection, where the updated information associated with the collection may be provided to allow the updated information associated with the collection to be provided for display to another user.

According to some possible implementations, a device may include one or more processors to: receive information associated with a collection, where the information associated with the collection may include resource information corresponding to a set of resource identifiers, and where the information associated with the collection may include attribute information associated with the collection; provide, based on the information associated with the collection, a collection user interface for display to a user, where the collection user interface may include: the resource information, associated with the set of resource identifiers, and the attribute information associated with the collection; and a set of input elements associated with editing the resource information or the attribute information; receive, via the set of input elements, user input associated with editing the information associated with the collection; determine updated information associated with the collection based on the user input; and provide the updated information associated with the collection to permit the updated information associated with the collection to be provided for display to another user.

According to some possible implementations, a non-transitory computer-readable medium may store one or more instructions that, when executed by one or more processors, cause the one or more processors to: receive information associated with a collection including a set of uniform resource locators (URLs) and at least two of: a set of titles associated with the set of URLs, a set of images associated with the set of URLs, a set of descriptions associated with the set of URLs, or a set of tags associated with the set of URLs; provide, for display to a user, a collection user interface that includes the information associated with the collection and one or more input elements associated with editing the information associated with the collection; determine, based on user input via the one or more input elements, updated information associated with the collection; and provide the updated information associated with the collection to allow the updated information associated with the collection to be provided for display to another user.

BRIEF DESCRIPTION OF THE DRAWINGS

FIG. 4 is a flow chart of an example process for receiving and storing information associated with a URL collection;

FIG. 6 is a flow chart of an example process for providing and updating a collection user interface associated with a URL collection.

DETAILED DESCRIPTION

The following detailed description of example implementations refers to the accompanying drawings. The same reference numbers in different drawings may identify the same or similar elements.

A user may wish to share a set of uniform resource locators (URLs) such that other users (e.g., within an enterprise, a company, an organization) may view resources identified by the set of URLs, view information associated with the set of URLs (e.g., a title, a description), edit the set of URLs (e.g., add and/or remove URLs from the set, edit information associated with URLs included in the set), or the like.

Implementations described herein may allow a user to organize, manage, create, edit, and/or share a collection including a set of URLs (herein referred to as a collection), while enabling other users to view resources identified by the set of URLs, view information associated with the set of URLs, edit the information associated with the set of URLs, or the like. Organizing, managing, creating, editing, and/or sharing the set of URLs as a collection may allow the set of URLs, associated with the collection, to be efficiently shared with, viewed by, and/or accessed by other users (e.g., without a need to search for the URLs and/or the resources identified by the URLs), thereby conserving computing resources (e.g., processing resources, memory resources) and network resources. Moreover, organizing, managing, creating, editing, and/or sharing the set of URLs as a collection may allow for facilitated collaboration between users (e.g., since URLs may be readily and efficiently shared via the collection). Implementations described herein may also allow the user to access reporting information associated with the collection and/or other users to which the collection is provided for view, access, and/or editing.

Figure 1:
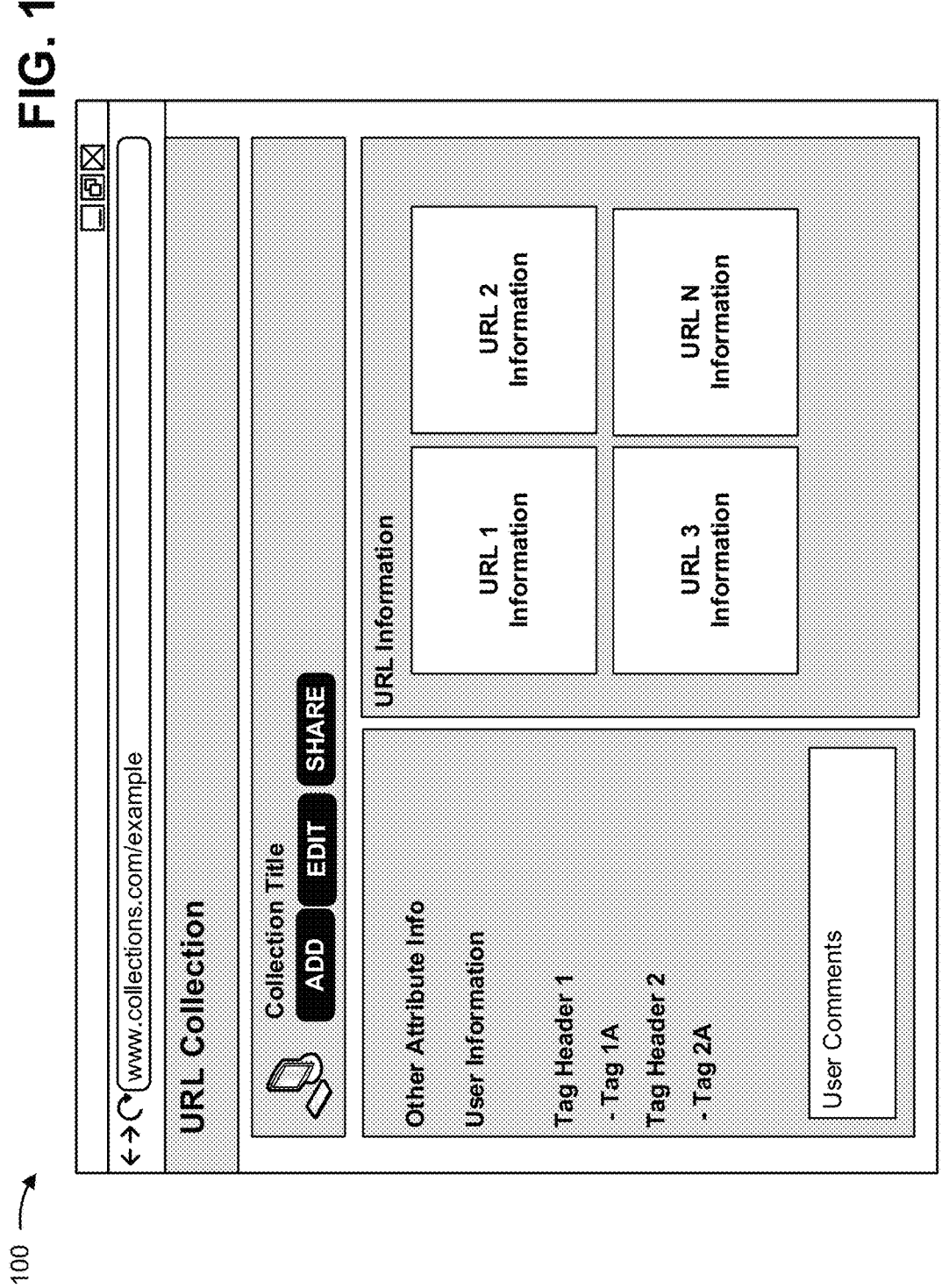
FIG. 1 is a diagram of an overview of an example implementation described herein.

FIG. 1 is a diagram of an overview of an example implementation 100 described herein. For the purposes of FIG. 1, assume that a user device has received (e.g., from a collection server associated with storing, managing, maintaining, or the like, a collection) information associated with the collection. The information associated with the collection may include, for example, attribute information associated with the collection, user information associated with the collection, access information associated with the collection, editing information associated with the collection, URL information associated with the collection, or the like. In some implementations, the URL information may include a set of images corresponding to a set of URLs. Details regarding the types of information associated with the collection are described below with regard to FIG. 4.

As shown in FIG. 1, the user device may provide, for display, a collection user interface, associated with the collection, based on the information associated with the collection. For example, as shown, the collection user interface may include the attribute information associated with the collection (e.g., an image associated with the collection, a title associated with the collection, other attribute information associated with the collection), the user information associated with the collection, or the like. As further shown, the collection user interface may include the URL information associated with the collection (e.g., URL 1 information through URL N information), such as the set of images corresponding to the set of URLs. In this way, the collection user interface may represent the set of URLs in a visual manner (e.g., in order to provide the user with visual cues that may allow the user to readily identify subjects of the URLs via the collection user interface). As further shown, the collection user interface may include one or more tags and/or tag headers associated with the collection. In some implementations, the URL information may include information associated with the tags and/or tag headers.

In some implementations, the user may organize, manage, and/or edit the information associated with the collection via the collection user interface. For example, the user may provide input, via the collection user interface, that causes the user device to update the collection user interface. As a particular example, the user may interact with a particular tag and/or tag header in order to cause the user device to update the collection user interface to include URL information associated with only URLs corresponding to the particular tag and/or tag header.

As another example the user may provide input associated with the adding a URL to the collection, removing a URL from the collection, editing URL associated with a URL included in the collection, via the collection user interface. As yet another example, the user may cause the collection to be shared (e.g., via a social networking application) and/or embedded (e.g., in a web page) by providing input via the collection user interface.

In some implementations, after receiving user input associated with updating, modifying, editing, or the like the information associated with the collection, the user device may provide updated collection information to the collection server. The collection server may store the updated information associated with the collection such that the updated information associated with the collection may be provided for display to another user (e.g., via another user device). In this way, a user may organize, manage, create, edit, and/or share a collection including a set of URLs, while enabling other users to view resources identified by the set of URLs, view information associated with the set of URLs, edit the information associated with the set of URLs, or the like.

As indicated above, FIG. 1 is provided merely as an example. Other examples are possible and may differ from what was described with regard to FIG. 1.

Figure 2:
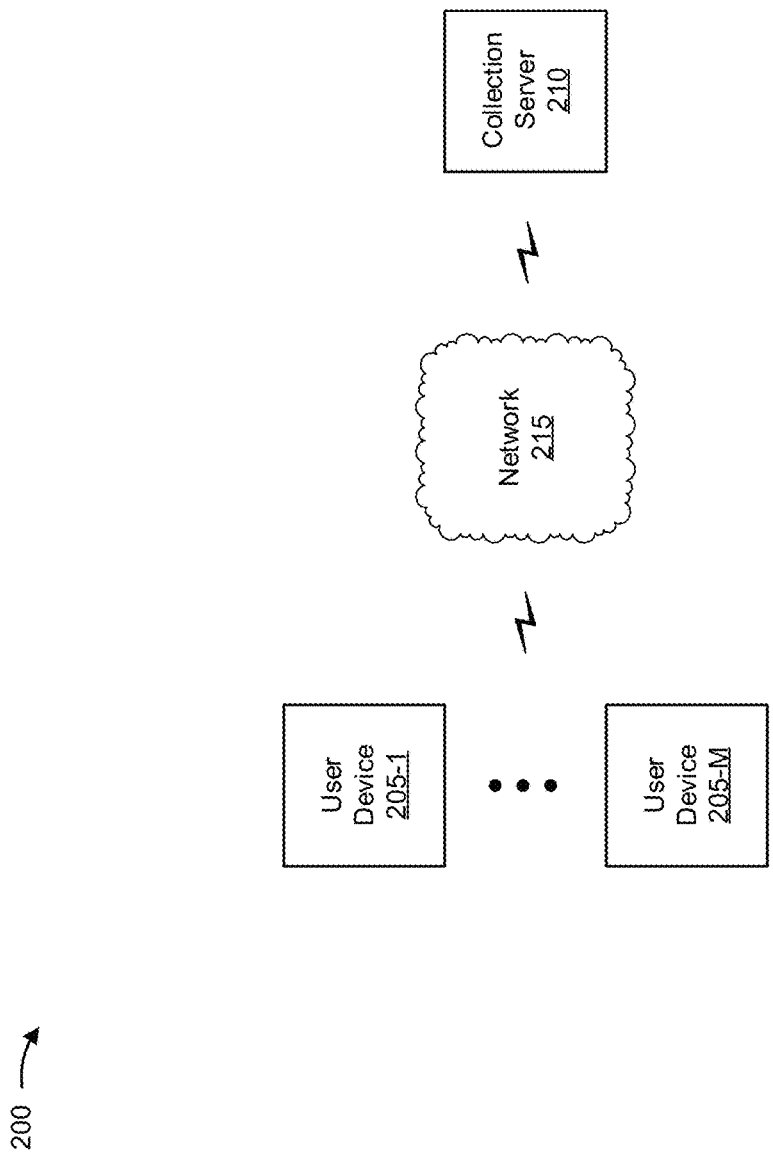
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 205-1 through 205-M (M≥1) (hereinafter referred to collectively as user devices 205, and individually as user device 205), a collection server 210, and a network 215. Devices of environment 200 may interconnect via wired connections, wireless connections, or a combination of wired and wireless connections.

User device 205 includes one or more devices capable of receiving, generating, storing, processing, and/or providing information associated with a collection stored and/or managed by collection server 210. For example, user device 205 may include a communication and computing device, such as a mobile phone (e.g., a smart phone, a radiotelephone, etc.), a laptop computer, a desktop computer, a tablet computer, a handheld computer, a gaming device, a wearable communication device (e.g., a smart watch, a pair of smart eyeglasses, etc.), or a similar type of device. In some implementations, user device 205 may receive and/or transmit information associated with a collection from and/or to collection server 210.

Collection server 210 includes one or more devices capable of receiving, storing, managing, and/or providing information associated with a collection. For example, collection server 210 may include a server device or a group of server devices. In some implementations, collection server 210 may receive and/or transmit information associated with a collection from and/or to user device 205.

In some implementations, collection server 210 may store and/or manage the information associated with the collection using a multi-layer architecture, where each layer carries out one or more different tasks, and where each layer can be separately developed, maintained, and/or modified. The multi-layer nature of the architecture may allow for components of each layer to be easily maintained, interchanged, and/or modified.

As an example, collection server 210 may implement a three layer architecture that includes a presentation layer, a logic layer, and an access layer. The presentation layer may include a layer responsible for user interaction associated with the collection, and may include a web page (e.g., an ASP.NET page) that uses hypertext markup language (HTML), cascading style sheets (CSS), JavaScript, JQuery, or the like, in order to provide a user-friendly format for navigation of the collection. The logic layer may include a layer responsible for validations, calculations, aggregations, and/or transformations of data associated with the collection. The data layer may include a layer responsible for storing and/or retrieving information associated with the collection to and/or from storage (e.g., a structured query language (SQL) database).

Network 215 includes one or more wired and/or wireless networks. For example, network 115 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
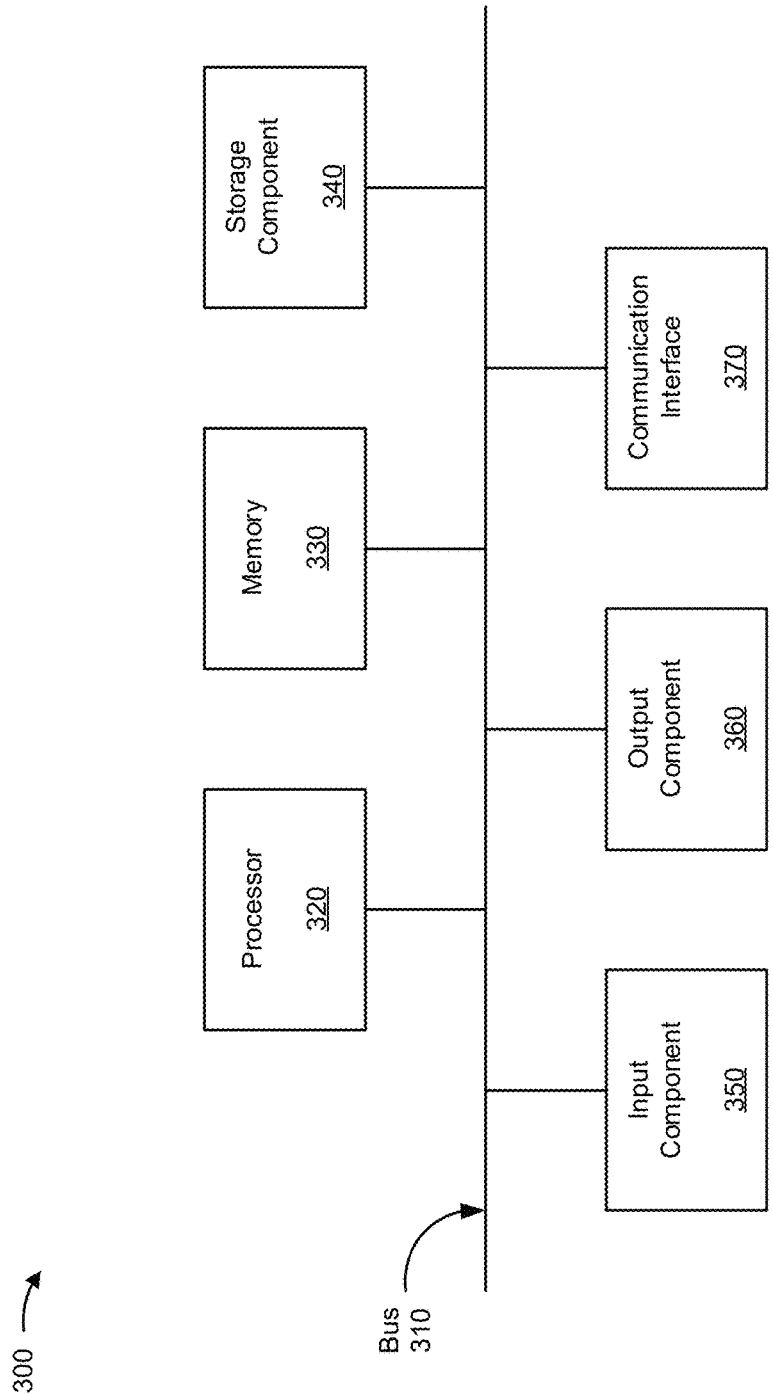
FIG. 3 is a diagram of example components of one or more devices of FIG. 2.

FIG. 3 is a diagram of example components of a device 300. Device 300 may correspond to user device 205 and/or collection server 210. In some implementations, user device 205 and/or collection server 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for receiving and storing information associated with a collection. In some implementations, one or more process blocks of FIG. 4 may be performed by collection server 210. In some implementations, one or more process blocks of FIG. 4 may be performed by another device or a group of devices separate from or including collection server 210, such as user device 205.

As shown in FIG. 4, process 400 may include receiving information associated with a collection (block 410). For example, collection server 210 may receive information associated with a collection. The collection may include a set of URLs that may be viewed and/or accessed via a collection user interface. In some implementations, collection server 210 may receive the information associated with the collection based on user input, as described below. Additionally, or alternatively, collection server 210 may receive the information associated with the collection when another device provides the information associated with the collection, such as user device 205.

In some implementations, the information associated with the collection may include attribute information associated with the collection, such as a title of the collection, a category of the collection, an image associated with the collection, or the like.

Additionally, or alternatively, the information associated with the collection may include user information associated with the collection, such as information that identifies a user that created the collection, a user that is an administrator of the collection, a user that is an owner of the collection, a user that can and/or has edited the collection, a user that follows the collection (e.g., such that the user is notified of additions to and/or new comments associated with the collection), or the like.

Additionally, or alternatively, the information associated with the collection may include display information associated with the collection. For example, the information associated with the collection may include information that identifies a manner in which the collection is to be provided for display (e.g., a list view, a tile view), an order in which URLs included the collection are to be displayed (e.g., an order defined by a creator, alphabetical order, a chronological order), or the like. As another example, the information associated with the collection may include information that identifies a manner in which tags, associated with the collection, are to be displayed, such as list view organized by tag headers (e.g., categories or subjects associated with tags), a cloud view (e.g., where a tag that is associated with more URLs in the collection than another tag is displayed differently than the other tag, such as in a bold font, a larger font, a different color), or the like.

Additionally, or alternatively, the information associated with the collection may include access information associated with the collection. For example, the information associated with the collection may include information (e.g., a username, a name of a directory including a group of users) that identifies one or more users that are permitted to access the collection (e.g., a white list) and/or information that identifies one or more users that are not permitted to access the collection (e.g., a black list). In some implementations, the access information may indicate that the collection is a private collection (i.e., accessible by only a particular set of users) or a public collection (i.e., accessible by any user).

Additionally, or alternatively, the information associated with the collection may include editing information associated with the collection. For example, the information associated with the collection may include information that identifies one or more users that are permitted to edit URLs included in the collection (e.g., add URLs to the collection, remove URLs from the collection, edit information associated with URLs included in the collection), one or more users that are not permitted to edit the URLs included in the collection, one or more users that are permitted to edit the attributes of the collection (e.g., edit the collection title, the collection category, the image associated with the collection), one or more users that are not permitted to edit the attributes of the collection, or the like.

Additionally, or alternatively, the information associated with the collection may include URL information associated with the collection. For example, the information associated with the collection may include a URL, a title associated with the URL, a description associated with the URL, a tag (e.g., a keyword, a subject, a topic) associated with the URL, a tag header associated with the tag, or the like. As another example, the URL information may include an image associated with the URL, such as a thumbnail image, an image copied from a web page associated with the URL, or the like. In some implementations, the image may be included in collection user interface (e.g., as described below) in order to provide the user with a visual cue that facilitates user identification of a subject of the URL via the collection user interface, thereby enhancing user experience. In some implementations, the information associated with the collection may include URL information corresponding to multiple URLs (i.e., the collection may include multiple URLs).

Figure 5A:
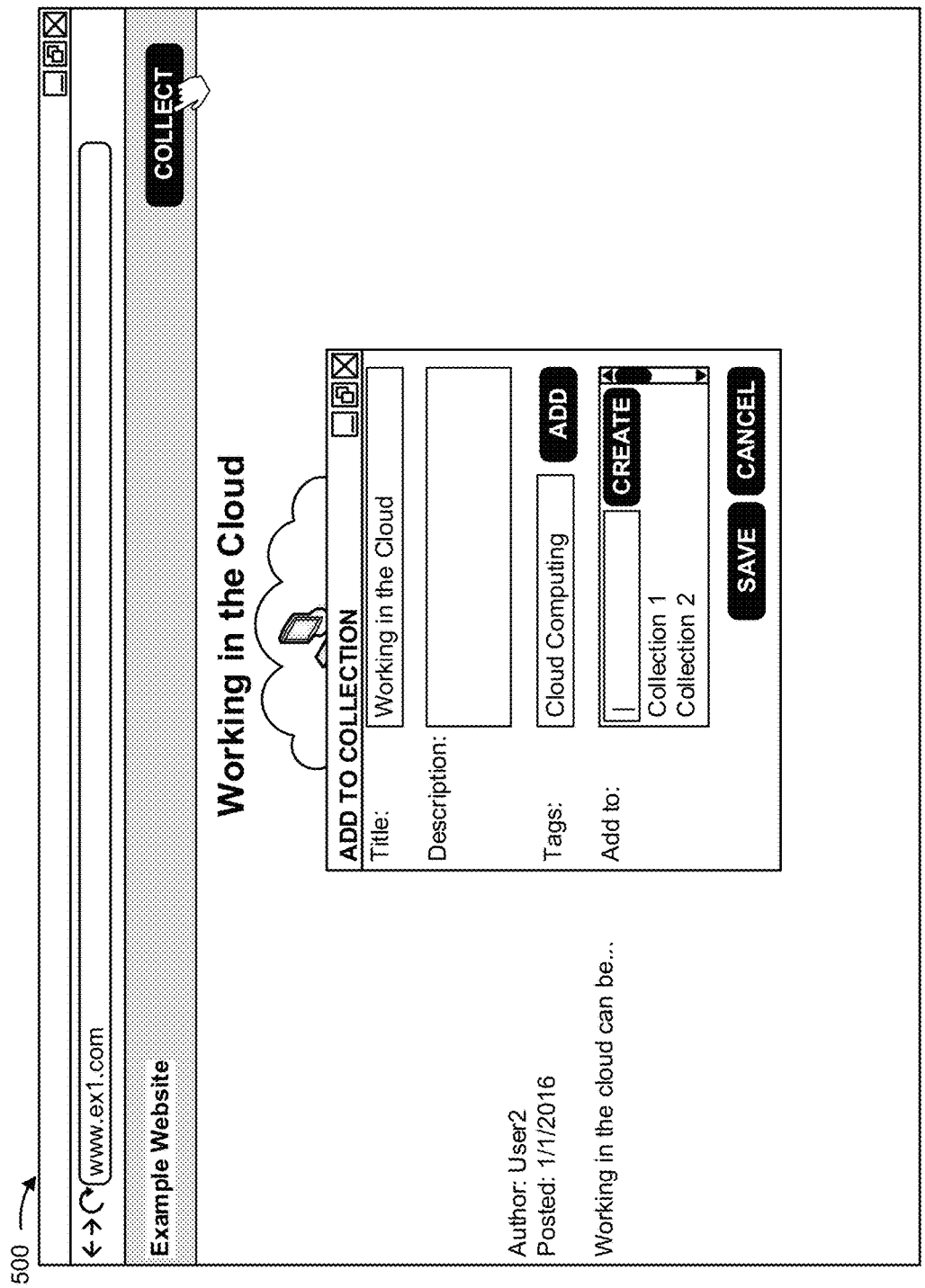
FIGS. 5A-5E are diagrams of an example implementation relating to the example process shown in FIG. 4.

In some implementations, collection server 210 may receive the information associated with the collection based on user input associated with adding a URL to the collection. FIG. 5A is diagram of an example user interface associated with receiving the information associated with the collection based on user input associated with adding a URL to the collection. As shown in FIG. 5A, user device 205 may provide, for display to a user, a user interface associated with a resource (e.g., a web page, a document, a file, an image) identified by a URL. Here, the user may provide user input via, for example, a button (e.g., a "collect" button in a web browsing application), a menu item, a link, or the like, indicating that the user wishes to add the URL, associated with the resource, to a collection. As shown, user device 205 may then provide, for display, an addition user interface associated with adding the URL to a collection.

As shown, the addition user interface may include one or more input elements (e.g., text boxes, drop down menus, buttons) that allow the user to provide information associated with the collection. For example, the addition user interface may include one or more input elements that allow the user to provide URL information associated with the URL, such as a URL title, a URL description, a URL image (e.g., a thumbnail), a tag associated with the URL, a tag header associated with the tag, or the like. In some implementations, user device 205 may automatically determine the URL information. For example, user device 205 may auto-populate some or all of the URL information, and allow the user to supplement or modify the URL information. This may result in a savings in computing resources since user device 205 receives the URL information faster than if the user manually entered the information. In some implementations, user device 205 may auto-populate the URL information by, for example, generating a thumbnail of the resource, analyzing the resource to identify the other URL information, or the like.

As further shown, the addition user interface may include one or more input elements that allow the user to input attribute information associated with the collection, such as a title of the collection to which the URL is to be added. In some implementations, as shown, the user may add the URL to an existing collection (e.g., selectable via a window) or add the URL to a new collection (e.g., by selecting a "create" button).

Returning to block 410, in some implementations, when the user wishes to add the URL to a new collection (i.e., create a new collection including the URL), user device 205 may provide, for display, another user interface associated with providing additional information associated with the collection, such as other attribute information associated with the collection, display information associated with the collection, access information associated with the collection, editing information associated with the collection, or the like. In this example, after receiving the information associated with the collection via one or more user interfaces, user device 205 may provide the information associated with the collection to collection server 210.

Additionally, or alternatively, collection server 210 may receive the collection information based on user input associated with viewing and/or accessing the collection. For example, user device 205 may request (e.g., based on user input) information associated with a collection so that user device 205 may provide, for display to the user, a user interface associated with viewing and/or editing the collection (herein referred to as a collection user interface). In this example, user device 205 may receive, via one or more input elements of the collection user interface, the information associated with the collection. In other words, the user may indicate that the user wishes to enter additional information and/or edit information associated with the collection, and user device 205 may receive the information associated with the collection based on user input via the collection user interface. Here, user device 205 may provide the information associated with the collection to collection server 210 when, for example, the user has finished entering additional information associated with the collection and/or editing the information associated with the collection. In some implementations, the user may be permitted to edit the collection only when authorized according to the access information associated with the collection.

Figure 5B:
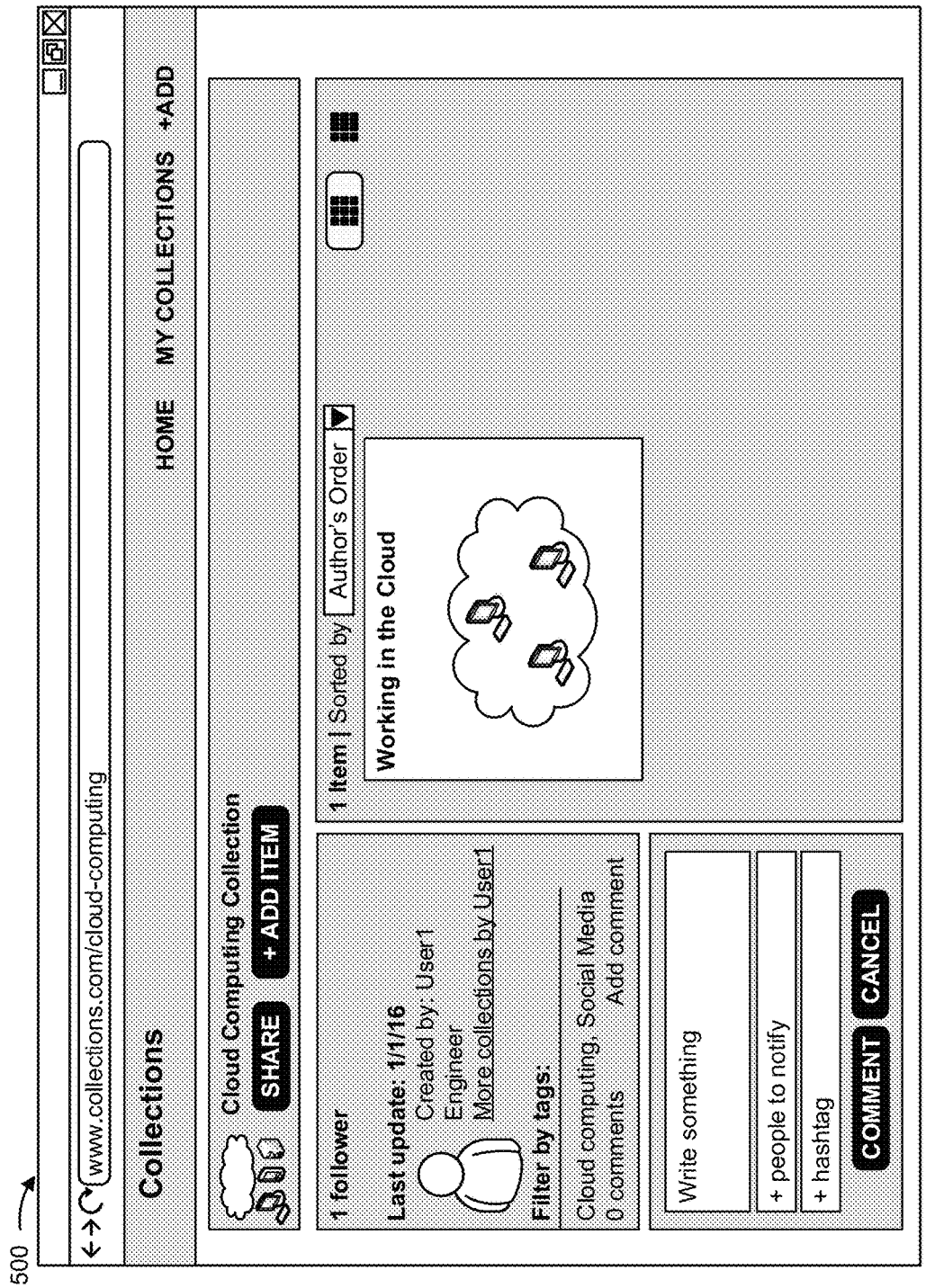

FIG. 5B is a diagram of an example user interface associated with receiving the information associated with the collection based on user input associated with viewing and/or accessing the collection. For the purposes of FIG. 5B, assume that collection server 210 stores information associated with a collection (e.g., title "cloud computing collection"), that includes a single URL (e.g., "a URL associated with a "working in the cloud" resource). Further, assume that a user has indicated that the user wishes to view the collection (e.g., such that the user may view one or more resources, edit the information associated with the collection, enter additional information associated with the collection), and that the collection server 210 has provided the information associated with the collection to user device 205.

As shown in FIG. 5B, user device 205 may provide, for display, the collection user interface associated with the collection. As shown, the collection user interface may include information associated with the collection, such as attribute information (e.g., a collection title, a collection image), user information (e.g., information associated with a creator of the collection), URL information (e.g., a URL title, a web page thumbnail), or the like. Here, the user may select a "+add item" button associated with adding one or more URLs to the collection. In some implementations, user device 205 may provide an addition user interface, and may receive URL information, associated with adding a URL to the collection, in a manner similar to that described above with regard to FIG. 5A.

Returning to block 410, additionally, or alternatively, user device 205 may provide, for display, a mass import user interface associated with concurrently importing a set of URLs to the collection. For example, user device 205 may allow the user to specify a file (e.g., a spreadsheet) that includes a set of URLs and corresponding URL titles, URL descriptions, information that identifies URL images, tags, or the like. Here, user device 205 may determine the URL information based on information included in the file, and may display the URL information via the mass import user interface. This may allow user device 205 to conserve computing resources by allowing user device 205 to receive the URL information at one time (e.g., rather than separately and/or individually).

Figure 5C:
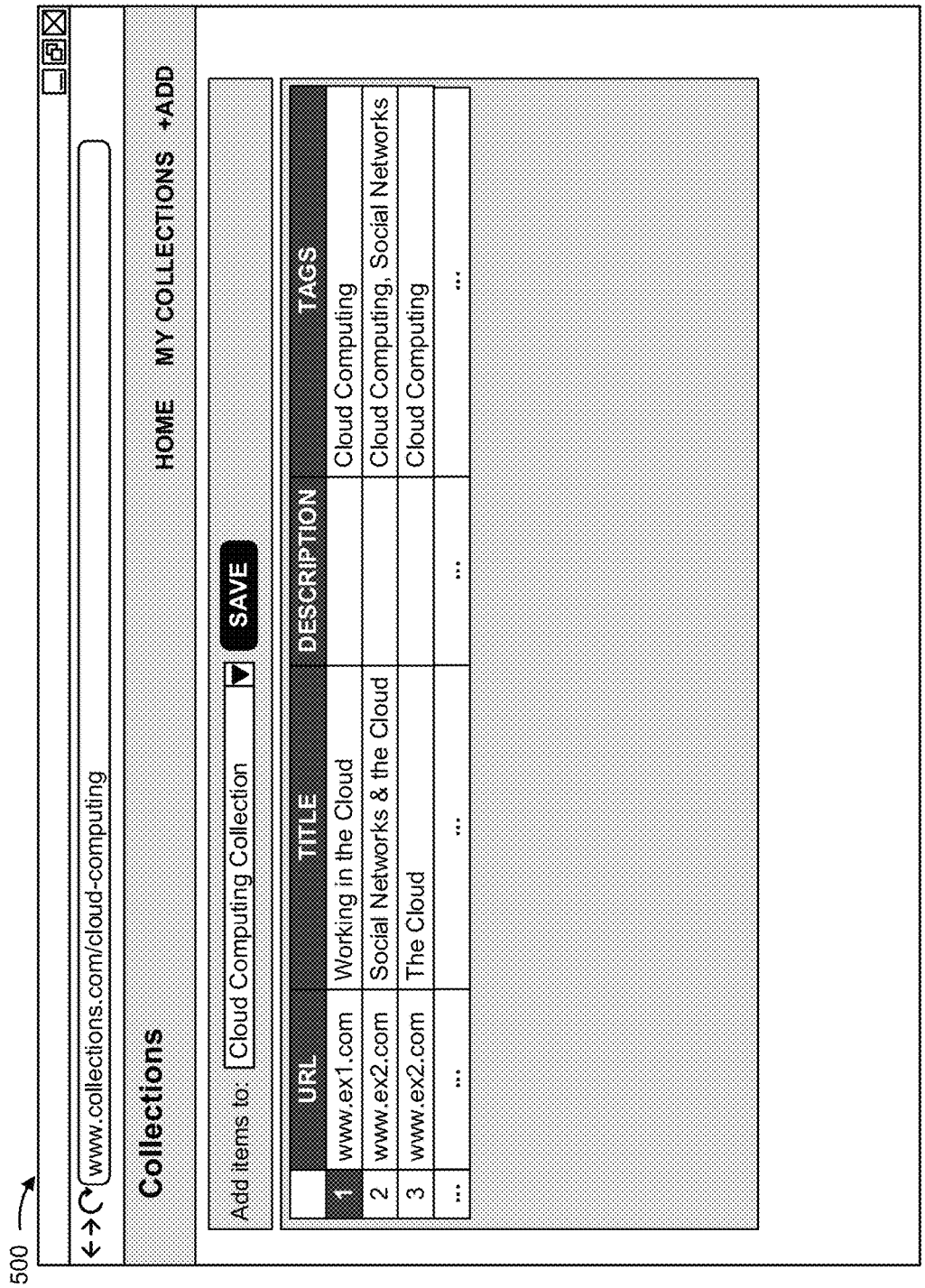

In some implementations, user device 205 may provide the mass import user interface for display when user device 205 receives, via an input element of the collection user interface, user input indicating that user device 205 is to provide the mass import user interface for display. FIG. 5C is a diagram of an example mass import user interface associated with concurrently importing a set of URLs to a collection. As shown in FIG. 5C, the user may input (e.g., via a text box, a drop down menu) information that identifies the collection (e.g., this input element may be automatically populated with the collection title when the user navigates to the mass import user interface via a collection user interface associated with a collection). As further shown, the mass import user interface may include the URL information associated with the set of URLs to be added to the collection. Here, the user may edit, add, and/or remove the URL information. The set of URLs may be concurrently imported to the collection when, for example, the user selects a "save" button on the mass import user interface. Here, user device 205 may provide the information associated with the collection (i.e., the URL information associated with the set of URLs) to collection server 210. In some implementations, mass importing the information associated with the collection may allow the user to efficiently import multiple URLs to the collection, thereby conserving computing resources and/or network resources (e.g., since adding the URLs to the collection may take place at one time via a single mass import user interface).

Figure 5D:
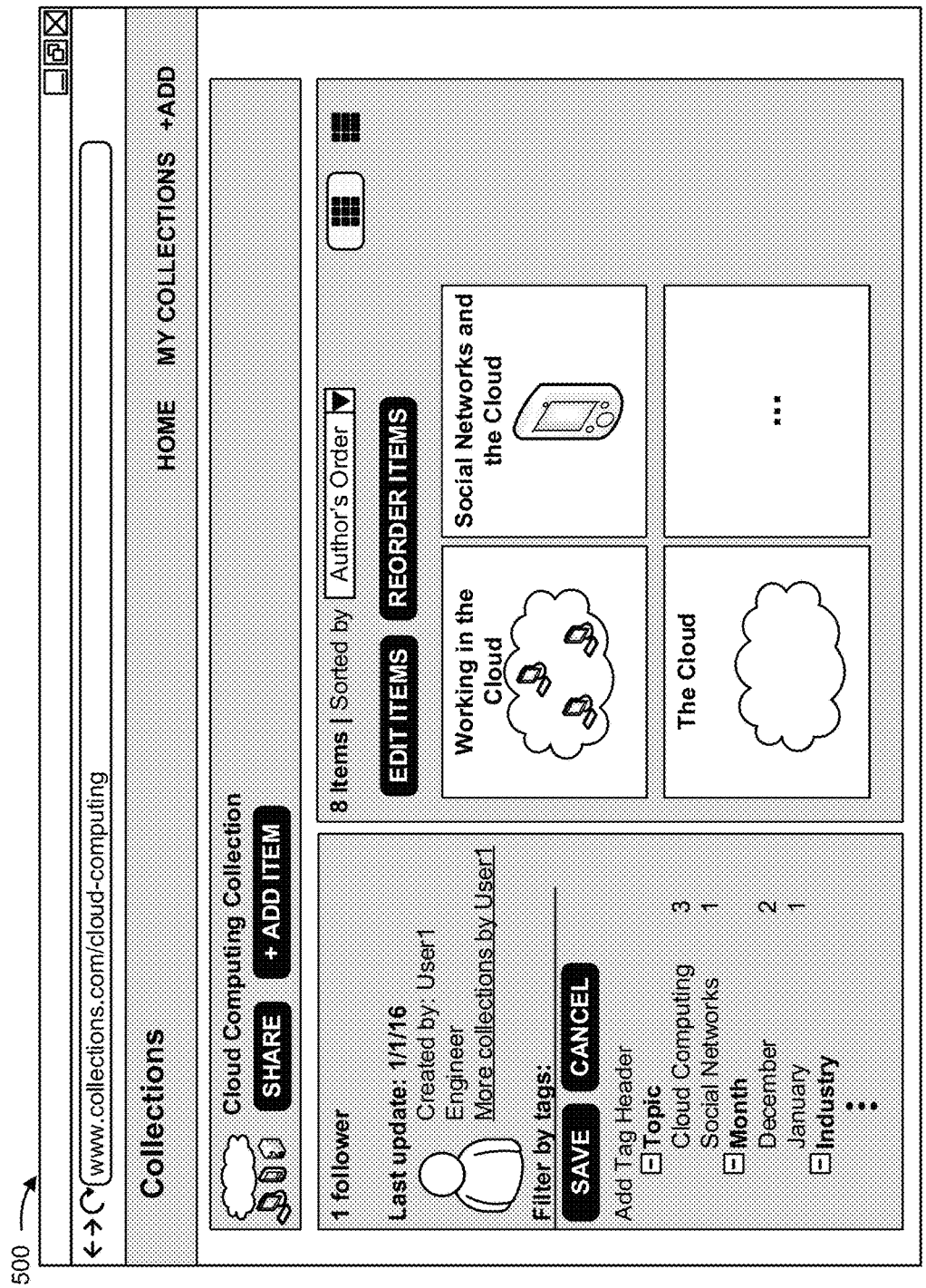

In some implementations, after the set of URLs is added to the collection, user device 205 may provide, for display, an updated collection user interface that includes the URL information associated with the set of URLs. FIG. 5D is a diagram of an example updated collection user interface after a set of URLs is concurrently imported to the collection. As shown in FIG. 5D, the updated collection user interface may include the URL titles, the URL descriptions, the URL images, tags, or the like, associated with the set of URLs added to the collection.

Returning to block 410, additionally, or alternatively, collection server 210 may receive the information associated with the collection based on user input associated with uploading a resource. For example, the user may indicate, via user device 205, that a resource, stored or accessible by user device 205, is to be added to the collection. Here, the user may provide input associated with the URL information, corresponding to the resource, to user device 205. User device 205 may provide the URL information and the resource to collection server 210. Collection server 210 may store the resource, generate a URL corresponding to a storage location of the resource, and store the URL information (e.g., such that the generated URL and the URL information are added to the collection).

In some implementations, collection server 210 may receive another type of information associated with the collection via the collection user interface. For example, the user may provide and/or edit, via one or more interfaces provided for display by user device 205, attribute information associated with the collection, user information associated with the collection, display information associated with the collection, access information associated with the collection, editing information associated with the collection, or the like.

In some implementations, collection server 210 may receive updated information associated with the collection. For example, collection server 210 may receive, from user device 205 and based on a user editing the information associated with the collection, updated attribute information (e.g., an updated title), updated user information (e.g., a username of a user that has recently edited the collection), updated display information (e.g., an updated order in which URL information is be displayed), updated access information (e.g., an updated list of one or more users that are not permitted to view the collection), updated editing information (e.g., an updated list of one or more users that are not permitted to edit the attributes of the collection), updated URL information (e.g., an updated description for a particular URL), or the like.

Figure 5E:
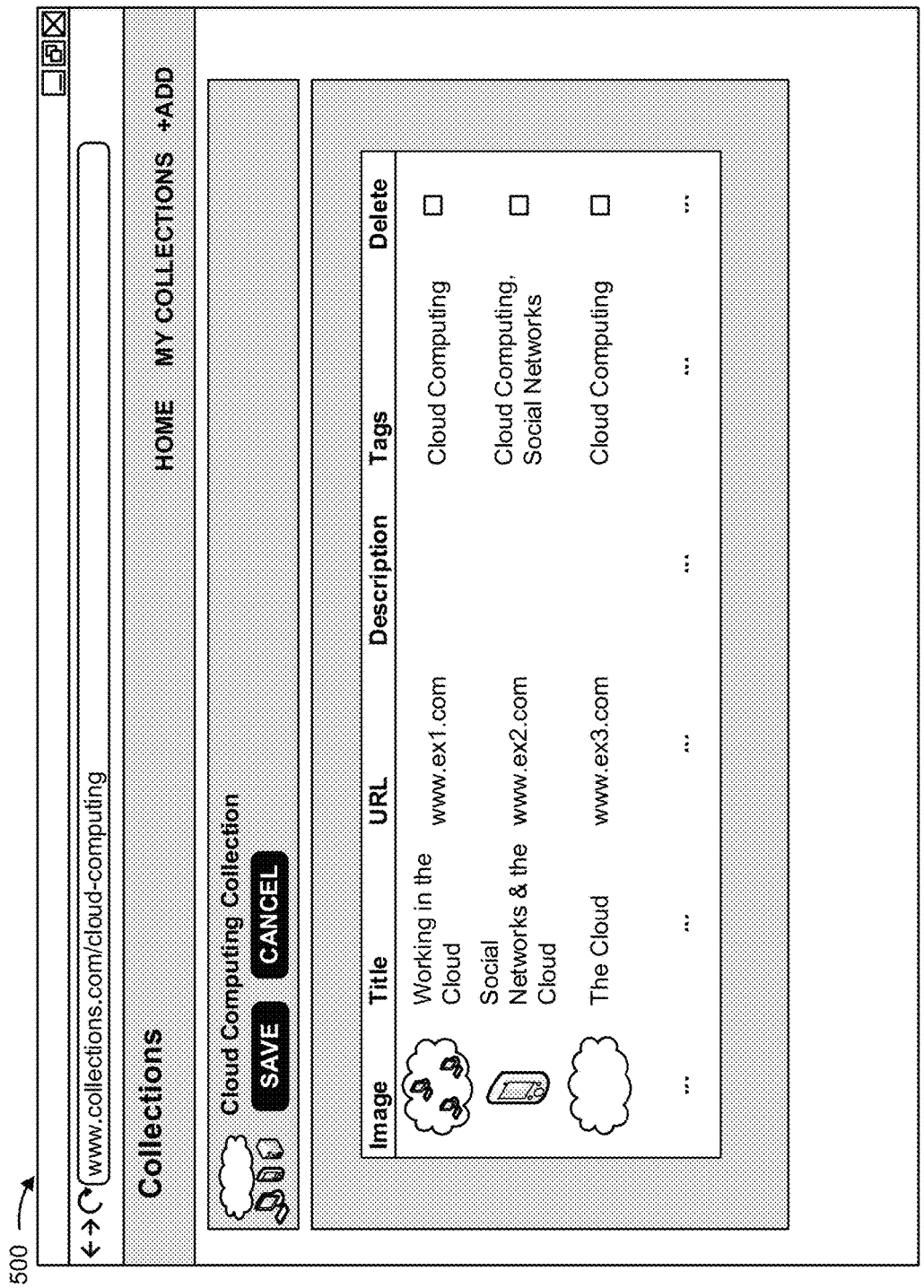

In some implementations, collection server 210 may receive updated information associated with multiple URLs included in the collection. For example, user device 205 may provide, for display, a mass edit user interface, associated with the collection, via which the user may edit URL information associated with multiple URLs (e.g., on a single mass edit user interface). FIG. 5E is a diagram of an example mass edit user interface associated with editing URL information for multiple URLs included in the collection. As shown in FIG. 5E, the user may edit the URL information (e.g., a URL title, a URL description, a URL image, a tag) and/or remove one or more URLs (e.g., by selecting a "delete" checkbox) from the collection via the mass edit user interface. The user may indicate (e.g., by selecting a "save" button) that the user is finished editing the multiple URLs. User device 205 may then provide the updated URL information to collection server 210. In some implementations, mass editing the information associated with the collection may allow the user to efficiently edit multiple URLs, thereby conserving computing resources and/or network resources (e.g., since editing of the URL information may take place at one time via a single mass edit user interface versus having to separately and individually access and edit each item of URL information).

Returning to FIG. 4, process 400 may include storing the information associated with the collection (block 420). For example, collection server 210 may store the information associated with the collection. In some implementations, collection server 210 may store the information associated with the collection after collection server 210 receives the information associated with the collection. Additionally, or alternatively, collection server 210 may store the information associated with the collection when collection server 210 receives, from user device 205, information indicating that collection server 210 is to store the information associated with the collection.

In some implementations, collection server 210 may store the information associated with the collection in one or more different data tables. For example, collection server 210 may store a URL data table that includes the URL, information (e.g., a collection title, a collection identification number) that identifies the collection in which the URL is included, the URL title, the description associated with the URL, information that identifies the image associated with the URL, or the like.

In this example, collection server 210 may also store a tag data table that includes a tag associated with one or more URLs, a tag header associated with the tag, the one or more URLs associated with the tag, URL titles of the one or more URLs, or the like. Based on storing the tag data table, collection server 210 may readily retrieve all URLs associated with a tag and/or a tag header. This may conserve computing resources consumed by collection server 210 when the user wishes to view URLs associated with a particular tag since, for example, collection server 210 need only determine a data table entry for the particular tag, rather than determining whether each URL is associated with the particular tag.

In some implementations, collection server 210 may store the information associated with the collection in a memory location (e.g., a RAM, a ROM, a cache, a hard disk, etc.) of collection server 210. In some implementations, collection server 210 may store information associated with the information associated with the collection such that previous information associated with the collection (e.g., information associated with the collection received by collection server 210 at an earlier time) is supplemented, modified, overwritten, deleted, or the like.

In some implementations, collection server 210 may store the information associated with the collection such that collection server 210 may determine the information associated with the collection at a later time (e.g., such that the information associated with the collection may be provided to user device 205 for display of a collection user interface at a later time).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 6 is a flow chart of an example process 600 for providing and updating a collection user interface associated with a collection. In some implementations, one or more process blocks of FIG. 6 may be performed by collection server 210. In some implementations, one or more process blocks of FIG. 6 may be performed by another device or a group of devices separate from or including collection server 210, such as user device 205.

As shown in FIG. 6, process 600 may include providing, for display, a collection user interface based on information associated with a collection (block 610). For example, user device 205 may provide the collection user interface based on information associated with a collection. In some implementations, user device 205 may provide the collection user interface for display when user device 205 receives the information associated with the collection from another device, such as collection server 210. Additionally, or alternatively, user device 205 may provide the collection user interface for display when user device 205 receives user input indicating that user device 205 is to provide the collection user interface for display.

In some implementations, user device 205 may provide the collection user interface for display based on receiving an indication that user device 205 is to provide the collection user interface for display. For example, the user may indicate (e.g., via a button, a menu item, a drop down menu, an embedded link) in, for example, a user interface associated with an application (e.g., a web browsing application, a social media application) that the user wishes to view the collection. In this example, user device 205 may request the information associated with the collection from collection server 210, and may provide the collection user interface when user device 205 receives the information associated with the collection from collection server 210.

In some implementations, user device 205 may provide the collection for display based on receiving the information associated with the collection. For example, a user may provide input indicating that the user wishes to view and/or edit the collection, as described above. Here, user device 205 may request the information associated with the collection from collection server 210, and may receive the information associated with the collection from collection server 210 in a response to the request. User device 205 may provide the collection user interface for display based on receiving the information associated with the collection for collection server 210.

Figure 7A:
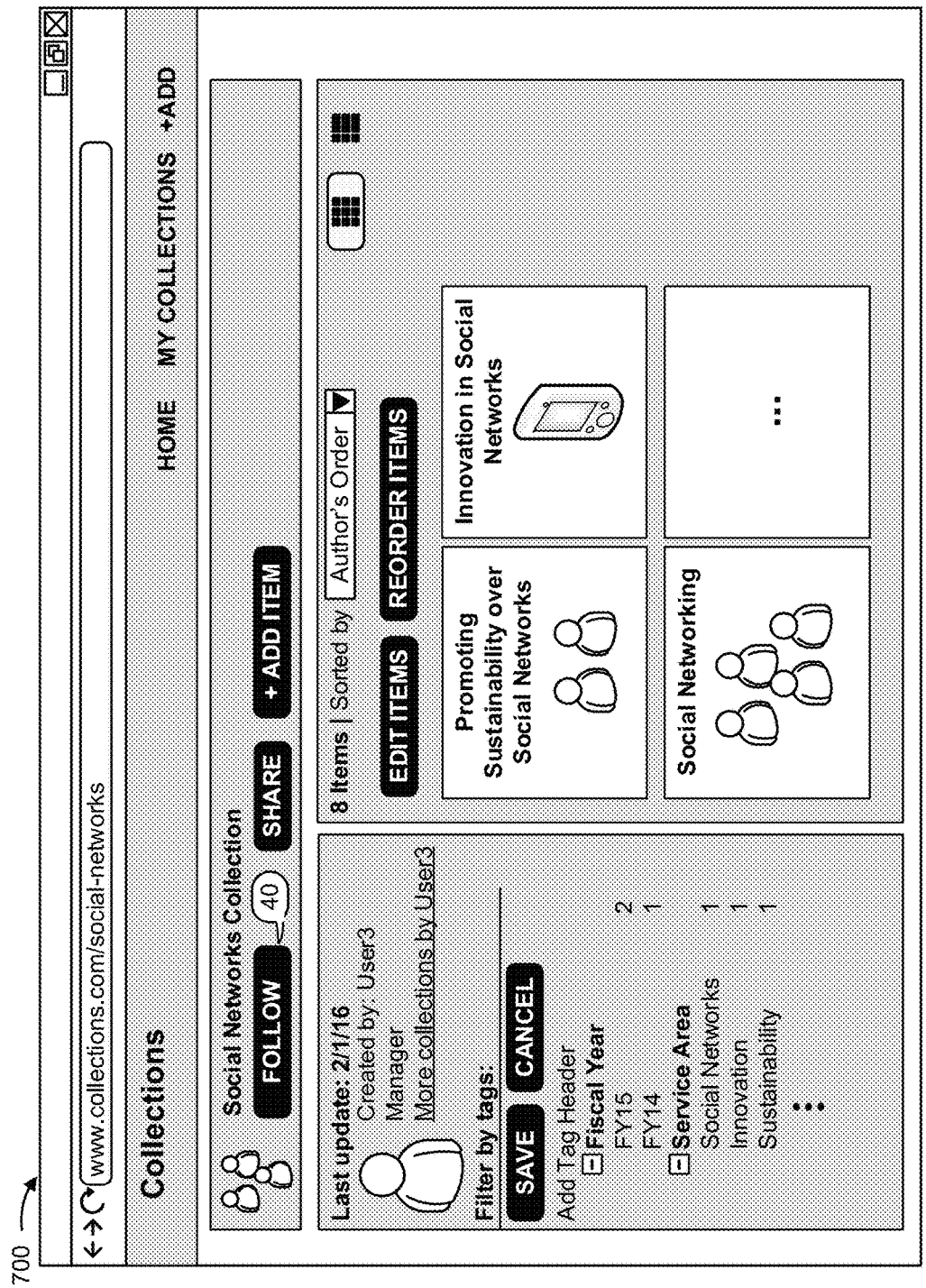
FIGS. 7A-7F are diagrams of an example implementation relating to the example process shown in FIG. 6.

FIG. 7A is a diagram of an example collection user interface associated with a collection. As shown in FIG. 7A, the collection user interface may include attribute information associated with the collection, such as a collection title (e.g., "social networks collection") and a collection image (e.g., an image displayed to the left of the collection title). As further shown, the collection user interface may include user information associated with the collection, such as information associated with a creator of the collection (e.g., "created by: user3, manager, more collections by user3) and a number of users that are following the collection (e.g., 40).

As shown in the lower right portion of FIG. 7A, the collection user interface may include URL information associated with a set of URLs included in the collection, such as a set of URL titles and a set of URL images (e.g., in a tile view). Here, inclusion of the set URL images in the collection user interface may enhance a user experience in that the set of URL images may allow the user to identify a subject, associated with each URL, via the collection user interface (e.g., from a single collection user interface, without a need to access each resource associated with the set of URLs).

As further shown, the collection user interface may also include tags associated with the set of URLs included in the collection, such as a set of tag headers (e.g., "fiscal year" and "service area") and one or more tags corresponding to each of the set of tag headers (e.g., "FY15, FY14" and "social networks, innovation, sustainability"). In some implementations, the collection user interface may include an indication (e.g., an icon, a symbol, a string of characters) indicating whether the collection is an official collection. An official collection may include a collection that is certified as being authored and/or approved by a particular entity, a particular user, or the like.

Returning to FIG. 6, process 600 may include receiving user input associated with the collection user interface (block 620) and updating the collection user interface based on the user input (block 630). For example, user device 205 may receive user input associated with the collection user interface, and may update the collection user interface based on the user input. In some implementations, user device 205 may receive the user input and update the collection user interface after user device 205 provides the collection for display to the user.

In some implementations, user device 205 may receive the user input via the collection user interface. For example, the collection user interface may include one or more input elements, such as buttons, text boxes, menus, or the like, that allow the user to provide input via the collection user interface.

In some implementations, the user input may be associated with modifying a manner in which the collection is displayed via the collection user interface. For example, the user device 205 may allow the user to provide input associated with sorting the URL information included in the collection user interface, for example, by date (e.g., a date associated with each URL, a date that each URL was added to the collection), by popularity, by URL title (e.g., alphabetically), based on information associated with the URL (e.g., alphabetically by author), based on an order specified by the creator and/or owner of the collection, by quantity of accesses (e.g., accesses by other users that have viewed the collection), by frequency of accesses, or the like. In this example, user device 205 may receive the user input associated with modifying the display of the collection, and may update the collection user interface, accordingly.

In some implementations, the display modification may be stored as specific for the user who made the modification (e.g., such that if the user accesses the collection later, the information associated with the collection is sorted as indicated by the user). Additionally, or alternatively, the display modification may be stored for all users (e.g., such that for any user that accesses the collection later, the information associated with the collection is sorted as the user indicated).

Additionally, or alternatively, the user input may be associated with searching the collection. For example, user device 205 may allow the user to provide (e.g., via a textbox) a search term, such as a string of characters, a word, a sentence, a name, a date, or the like. Here, user device 205 may receive the search term and may search the URL information associated with the collection, text of resources identified by the URLs included in the collection, or the like. In some implementations, user device 205 may provide the search term to collection server 210 and collection server 210 may perform the search. In this example, user device 205 may determine a result of the search (e.g., URL information associated with a resource that includes the search term), and may update the collection to include information associated with the result of the search. In some implementations, user device 205 and/or collection server 210 may search multiple collections (e.g., the collection associated with the currently displayed collection user interface and one or more other collections for which information is stored by collection server 210).

Figure 7B:
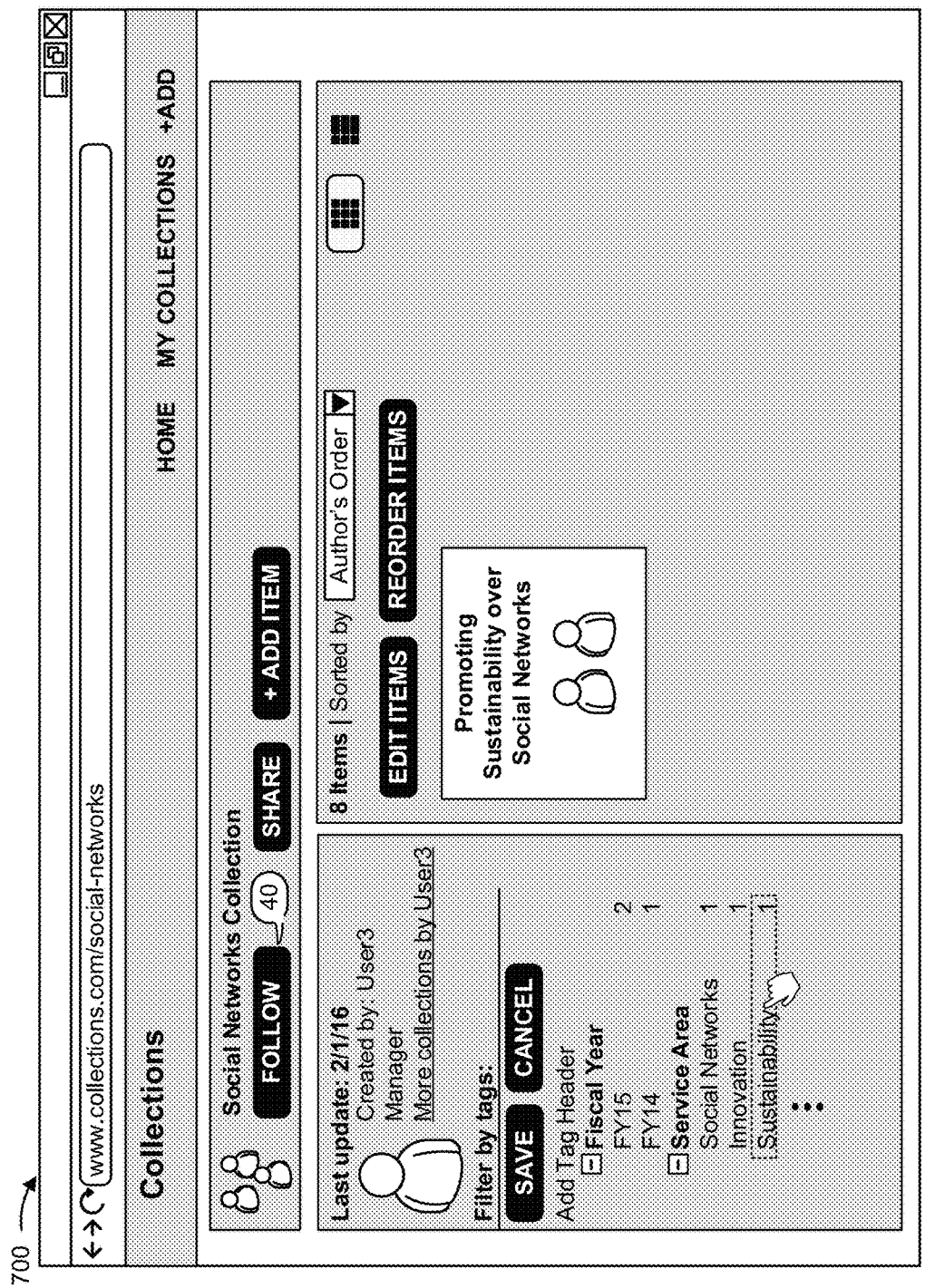

Additionally, or alternatively, the user input may be associated with one or more tags identified in the collection user interface. FIG. 7B is a diagram of an example user interface associated with updating the collection user interface based on user input associated with a tag. As shown in the lower left portion of FIG. 7B, the user may select a particular tag (e.g., "sustainability") associated with a particular tag header (e.g., "service area"). Here, based on the user input and the information associated with the collection, user device 205 may identify one or more URLs associated with the selected tag. As shown, user device 205 may update the collection user interface to include information associated with only those URLs associated with the selected tag. In the example shown in FIG. 7B, a single URL (e.g., a URL associated with "promoting sustainability over social networks") is associated with the selected tag. In this way, user device 205 may provide, for display, the information associated with the collection based on one or more tags identified and/or selected by the user, thereby conserving computing resources and/or network resources (e.g., since the user need not separately search for and/or navigate to URLs associated with the tag). In some implementations, user device 205 may allow the user to select one or more tags and/or one more tag headers (e.g., associated with one or more tags) and user device 205 may update the collection user interface in this manner. In a case where the user has selected multiple tags and/or one or more tag headers, user device 205 may display the URL information based on an order associated with the selected group of tags, such as an alphabetical order, an order identified by the user, or the like.

Returning to blocks 620 and 630, additionally, or alternatively, the user input may be associated with commenting on the collection. For example, user device 205 may allow the user to provide (e.g., via a textbox) a comment (e.g., a word, a sentence, a paragraph, an emoji) associated with the collection. Here, user device 205 may receive the comment and may update a comment portion of the collection user interface to include the comment. In this example, other users that view the collection may view the comment and reply to the comment.

Figure 7C:
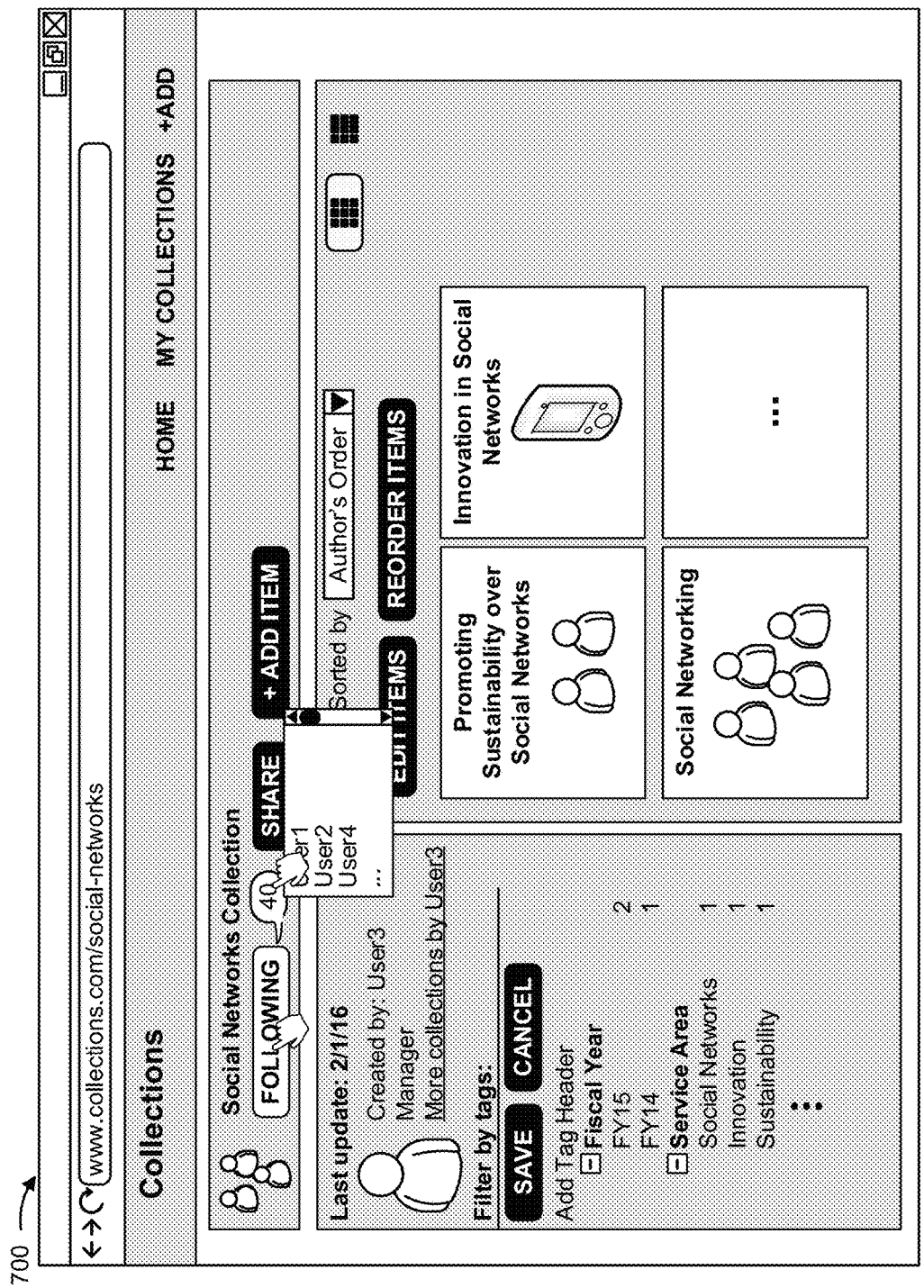

Additionally, or alternatively, the user input may be associated with following the collection. A user may follow the collection in order to cause the user to be notified when the collection is modified, updated, or the like. FIG. 7C is a diagram of an example user interface associated with updating the collection user interface based on following the collection. As shown in FIG. 7C, the user may provide (e.g., by selecting a "follow" button) an indication that the user wishes to follow the collection. Here, user device 205 may update the collection user interface to indicate that the user is following the collection by, for example, modifying the "follow" button to read as "following." In some implementations, collection server 210 may store information that identifies users that follow the collection, and may, upon receiving updated information associated with the collection, send a notification to the users that follow the collection.

As further shown in FIG. 7C, user device 205 may update the collection user interface to include information that identifies users that follow the collection. As shown, the user may interact with (e.g., select, hover over) a portion of the collection user interface that identifies a number of users that follow the collection. Here, based on the interaction, user device 205 may update the collection user interface to include information that identifies the users that follow the collection, such as a list of usernames (e.g., user1, user2, user4).

Figure 7D:
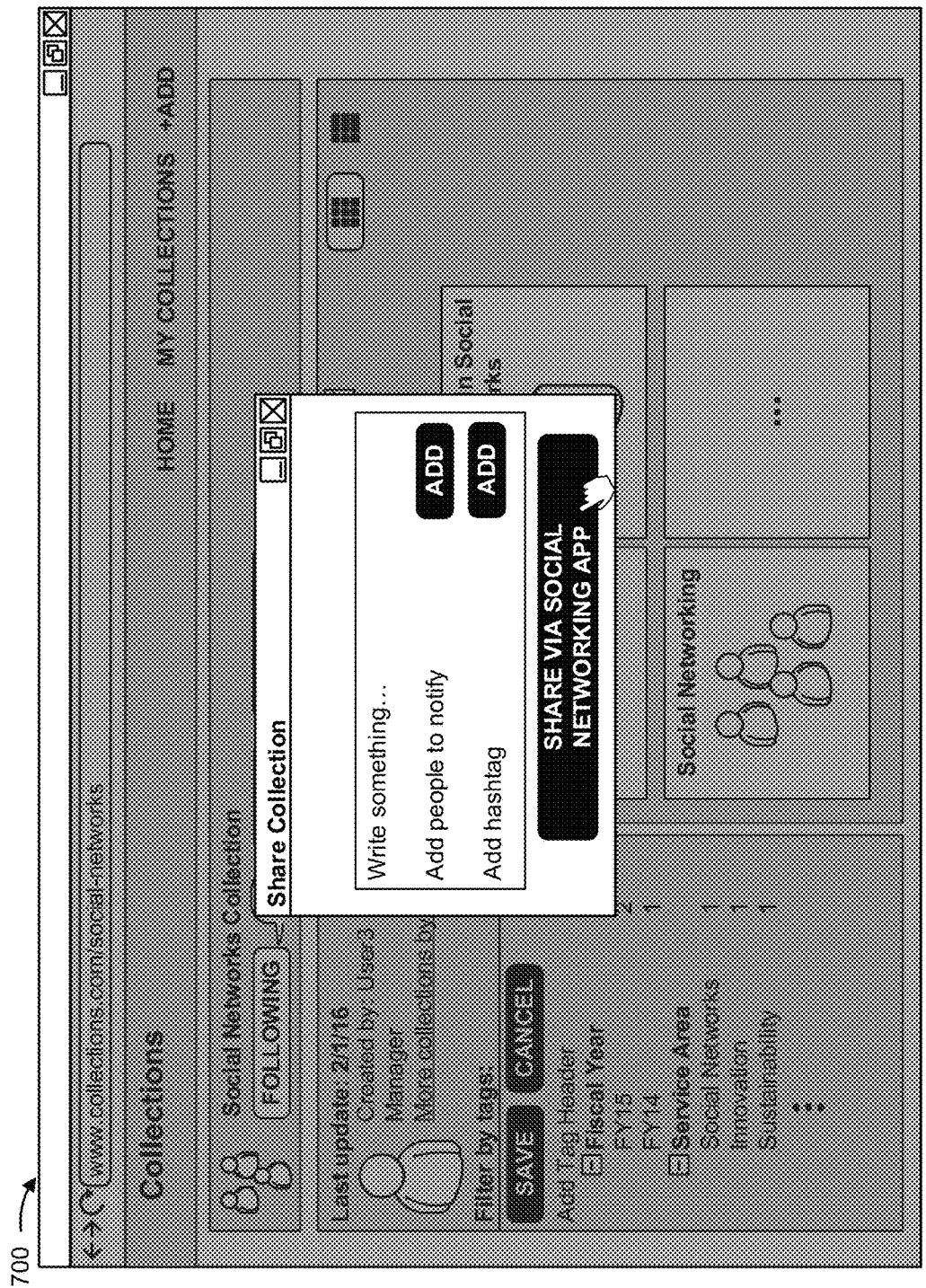

Returning to blocks 620 and 630, additionally, or alternatively, the user input may be associated with sharing the collection. In some implementations, the user may share the collection via, for example, a social networking application associated with an enterprise, a company, an organization, or the like. FIG. 7D is a diagram of an example user interface associated with updating the collection user interface based on user input associated with sharing the collection. For the purposes of FIG. 7D, assume that the user has selected a "share" button included in the collection user interface (shown in FIG. 7C). As shown in FIG. 7D, user device 205 may update the collection user interface to include a sharing user interface. The user may input, via the sharing user interface, information associated with sharing the collection, such as a comment, information that identifies one or more users to be notified regarding the sharing of the collection, a hashtag, or the like. Here, user device 205 may receive the user input associated with sharing the collection, and may, upon user selection of a "share via social networking app" button, provide the user input associated with the sharing collection and information associated with the collection. For example, user device 205 may provide the user input associated with the sharing collection and/or a link to the collection to a server device associated with the social networking application (e.g., such that the server device may provide the user input and the link via the social network application and notify the identified users).

In some implementations, a collection may be integrated with the social networking application. For example, the collection may be integrated with an enterprise social networking application such that the collection may be displayed via a microblogging feature of the enterprise social networking application. As another example, the collection may be integrated with the enterprise social networking application such that the user may view information associated with collections created, owned, managed, or the like, by the user's social networking peers (e.g., contacts, friends, followers, etc.).

In some implementations, user device 205 may allow the user to embed the collection (e.g., in a web page, via a social networking application, a blog, etc.). For example, user device 205 may receive (e.g., via an "embed" button" and an embedding user interface) user input indicating that the collection is to be embedded on a web page, display information associated with a manner in which the embedded collection is to displayed (e.g., a cover tile view including an image associated with the collection, a full view including a set of images and descriptions associated with the collection, a list view including a set of descriptions associated with the collection), information identifying whether details of the collection are to be displayed (e.g., show/hide description, contacts, comments, tags, etc.), or the like. Here, user device 205 may receive the user input, and may cause the collection to be embedded, accordingly (e.g., by providing the information to a device that hosts the web page).

Figure 7E:
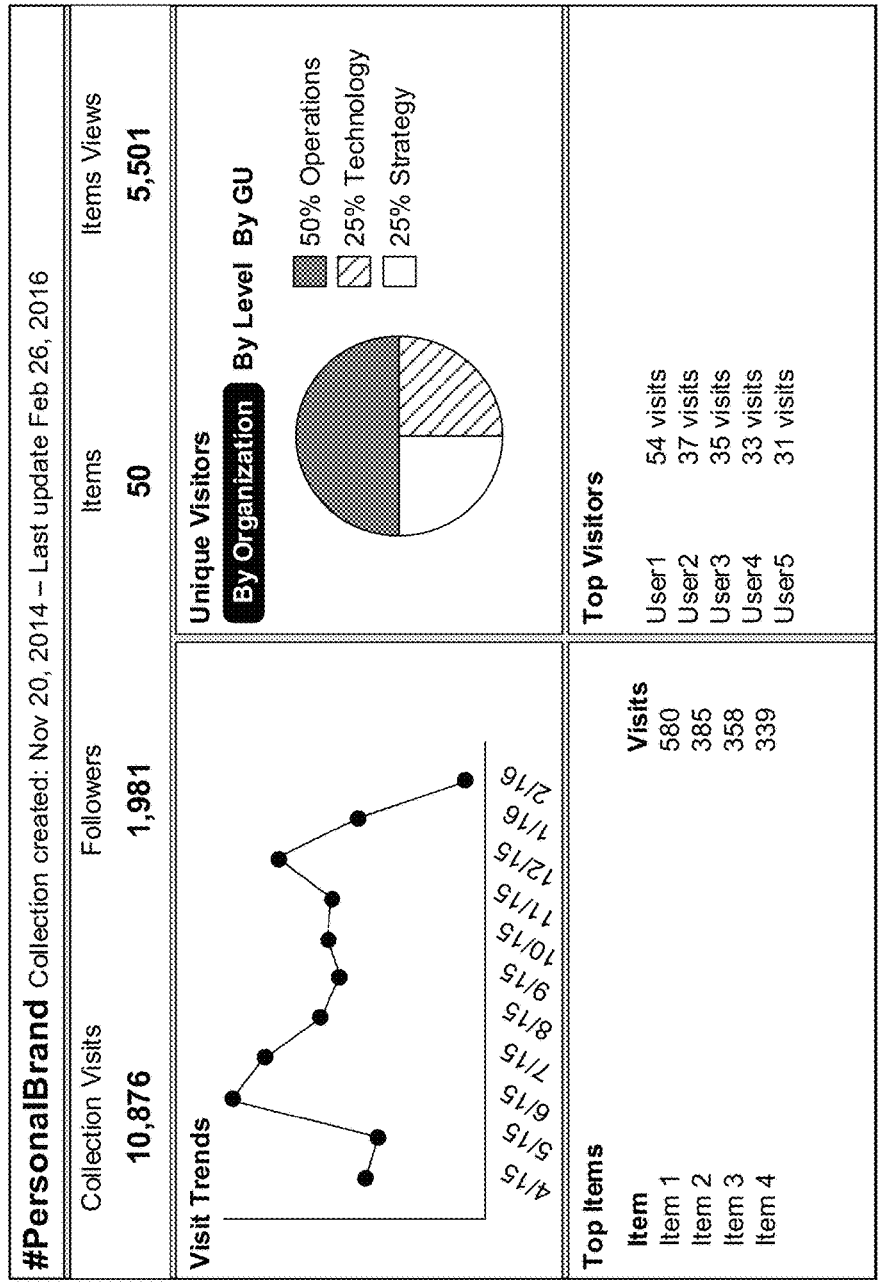

In some implementations, user device 205 may update the collection user interface to include usage information associated with the collection. The usage information may include information, available to any user that accesses the collection, associated with one or more metrics associated with the collection. FIG. 7E is a diagram of an example user interface that includes usage information associated with a collection. As shown in FIG. 7E, the usage information may include information that identifies a total number times the collection has been accessed, a total number of collection followers, a total number of items in the collection, a total number of accesses of items included in the collection, collection view trend information (e.g., number of collection accesses on a monthly basis, a daily basis, a weekly basis; a number of collection views and/or accesses on an organizational basis), most viewed and/or most popular items in the collection, users with the most accesses of the collection, or the like.

In some implementations, user device 205 may determine the usage information based on information provided by collection server 210. For example, collection server 210 may be configured to determine and store usage information, associated with the collection, when collection server 210 provides the information associated with the collection to user device 205. Here, user device 205 may receive the usage information from collection server 210 in a response to a request provided by user device 205, and may provide the usage information for display, accordingly.

In some implementations, user device 205 may filter the usage information, provided for display via the usage information user interface, based on user input. For example, user device 205 may receive user input that identifies a range of dates, and user device 205 may filter and display the usage information based on the range of dates. In some implementations, user device 205 may generate and/or store a document (e.g., an image file, a PDF document, a text document), associated with the usage information such that user device 205 may display or provide (e.g., for view by one or more users) the document at a later time.

Additionally, or alternatively, an item of information included in the usage information user interface may act as a link to another item of information. For example, a username in the usage information user interface may be a link to a user profile page associated with a user. As another example, an item name included in the usage information user interface may be a link to the corresponding item included in the collection.

Figure 7F:
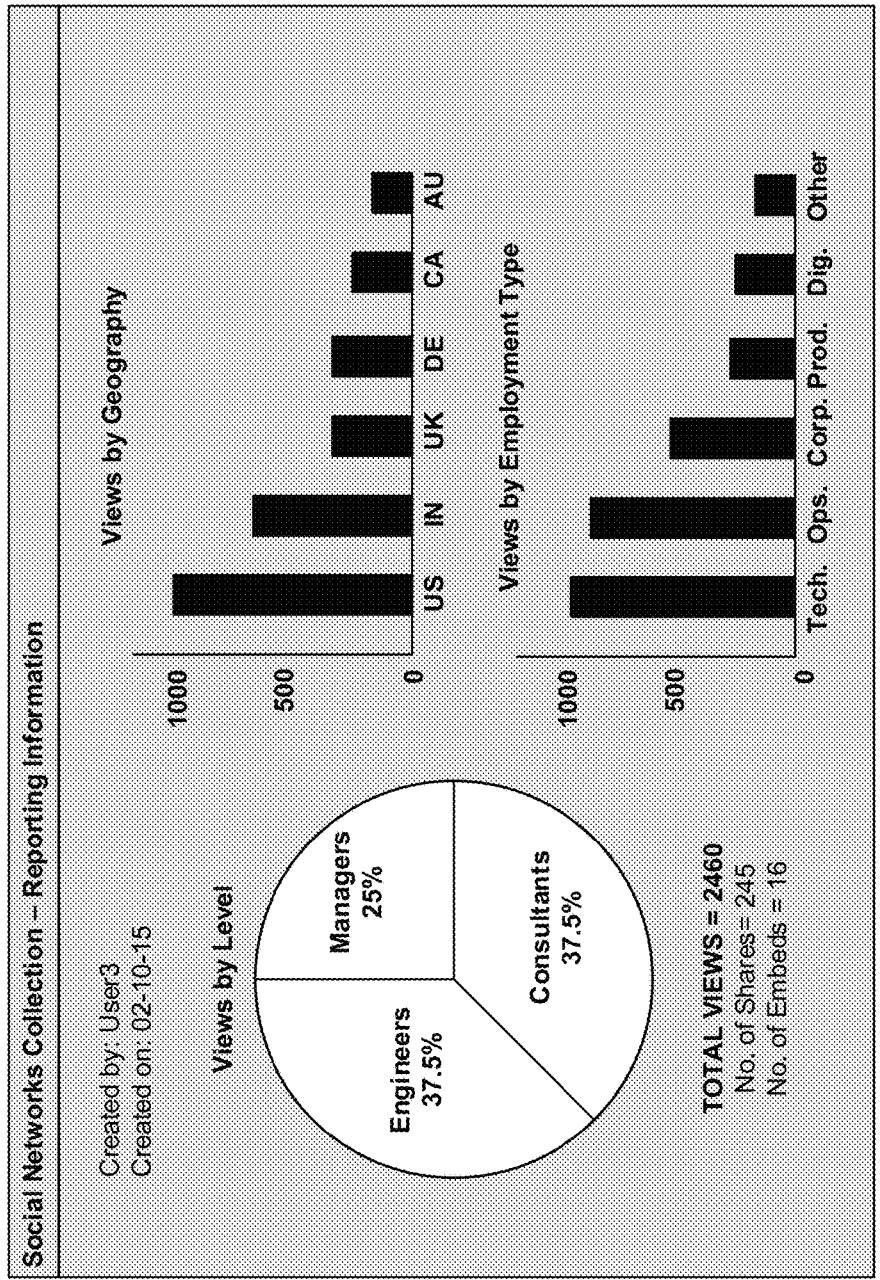

Additionally, or alternatively, user device 205 may update the collection user interface to include reporting information associated with the collection. The reporting information may include information, available to an authorized user (e.g., a creator of the collection, an owner of the collection, an administrator of the collection), associated with collection details, views, access, or the like. In some implementations, the reporting information may be more detailed and/or specific than the usage information. FIG. 7F is a diagram of an example user interface that includes reporting information associated with a collection. As shown in FIG. 7F, the reporting information may include details associated with the collection and/or views and/or accesses of the collection, such as information that identifies a creator the collection, a date that the collection was created, a date that the collection was edited, a number of URLs included in the collection, a number of followers associated with the collection, a number of social networking shares associated with the collection, information associated with instances when the collection has been embedded (e.g., in a web page, via a social networking application, etc.), information associated with users that have accessed the collection (e.g., a first and last name, a user identifier, demographic information, employment information, location information, information that identifies a date of access, etc.), a number of views and/or accesses associated with the collection (e.g., organized by employment level, location, employment type), or the like.

In some implementations, user device 205 may determine the reporting information based on information provided by collection server 210. For example, collection server 210 may be configured to determine and store reporting information, associated with the collection, when collection server 210 provides the information associated with the collection to user device 205. In other words, collection server 210 may store reporting information associated with each view, access, share, embed, or the like, of the collection. Here, user device 205 may receive the reporting information from collection server 210 in a response to a request provided by user device 205, and may provide the reporting information for display, accordingly.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein may allow a user to create, edit, or manage information associated with a set of URLs, while enabling other users to view the information associated with the set of URLs, edit the information associated with the set of URLs, or view resources identified by the set of URLs. Implementations described herein may also allow the user to access information associated with the other users to which the set of URLs or the resources identified by the set of URLs are provided for view or access.

The foregoing disclosure provides illustration and description, but is not intended to be exhaustive or to limit the implementations to the precise form disclosed. Modifications and variations are possible in light of the above disclosure or may be acquired from practice of the implementations. For example, while implementations described herein are described in the context of URLs, the implementations described herein may be applied to another type resource identifier, such as a uniform resource identifier (URI), a uniform resource name (URN), or the like.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
receiving, by a device, information associated with a collection including a first set of uniform resource locators (URLs),
the information associated with the collection including
a set of titles corresponding to the first set of URLs,
a set of images corresponding to the first set of URLs, and
attribute information associated with the collection;
providing, by the device and for display to a user, a collection user interface based on the information associated with the collection,
the user being one of a set of users associated with the collection, and
the collection user interface including:
the set of titles and the set of images corresponding to the first set of URLs,
the attribute information associated with the collection,
one or more input elements associated with editing the information associated with the collection, and
one or more input elements associated with sorting a display of the information associated with the collection;
determining, by the device and based on user input via the one or more input elements associated with editing the information associated with the collection, updated information associated with the collection,
the updated information associated with the collection including a file with a second set of URLs;
providing, by the device and for display to the user, an import user interface associated with concurrently importing the second set of URLs to the collection;
providing, by the device, the updated information associated with the collection,
the updated information associated with the collection being provided to allow the updated information associated with the collection to be provided for display to another user;
receiving, by the device and via an input element of the one or more input elements associated with another sorting the display of the information associated with the collection, information associated with the other sorting the display of the updated information associated with the collection;
updating, by the device and for display to the user, the collection user interface based on receiving the information associated with the other sorting the display of the updated information associated with the collection; and
storing, by the device, information associated with the updated collection user interface and information associated with the collection user interface,
the updated collection user interface associated with the other sorting being provided for presentation to the user, and
the collection user interface associated with the sorting being provided for presentation to the other users.

2. The method of claim 1, where the collection user interface further includes one or more tags associated with the first set of URLs, and
where the method further comprises:
detecting a user interaction associated with a tag of the one or more tags,
the tag being associated with a first subset of the first set of URLs and not being associated with a second subset of the first set of URLs; and
updating the collection user interface based on the user interaction with the tag,
the collection user interface being updated to include a first subset of titles and a first subset of images that correspond to the first subset of the first set of URLs, and
the collection user interface being updated to not include a second subset of titles and a second subset of images that correspond to the second subset of the first set of URLs.

3. The method of claim 1, where the collection user interface further includes one or more input elements associated with sharing the collection via an application, and
where the method further comprises:
receiving, via the one or more input elements associated with sharing the collection, an indication to share the collection; and
providing the information associated with the collection based on the indication,
the information associated with the collection being provided such that the collection is shared via the application.

4. The method of claim 1, where the collection user interface further includes one or more input elements associated with notifying the user of edits to the information associated with the collection, and
where the method further comprises:
receiving, via the one or more input elements associated with notifying the user of edits to the information associated with the collection, an indication to notify the user of edits to the information associated with the collection; and
providing information that causes the user to be provided with a notification of an edit to the information associated with the collection.

5. The method of claim 1, where determining the updated information associated with the collection comprises:
providing, for display to the user, a user interface associated with editing multiple items of information, associated with the collection, that correspond to multiple URLs; and
determining the updated information associated with the collection based on user input provided via the user interface.

6. The method of claim 1, further comprising:
determining reporting information associated with the collection,
the reporting information including details associated with displays or accesses of the collection; and
providing, for display to the user, the reporting information associated with the collection.

7. The method of claim 1, wherein receiving information associated with the other sorting the display comprises:
receiving information sorted by at least one of:
a date,
popularity,
URL title,
an order specified by a creator or owner of the collection,
a quantity of accesses by other users, or
a frequency of access.

8. A device, comprising:
a memory; and
one or more processors to:
receive information associated with a collection,
the information associated with the collection including resource information corresponding to a first set of resource identifiers, and
the information associated with the collection including attribute information associated with the collection;
provide, based on the information associated with the collection, a collection user interface for display to a user,
the user being one of a set of users associated with the collection, and
the collection user interface including:
the resource information, associated with the first set of resource identifiers, and the attribute information associated with the collection;
a set of input elements associated with editing the resource information or the attribute information, and
one or more input elements associated with sorting a display of the information associated with the collection;
receive, via the set of input elements, user input associated with editing the information associated with the collection;
determine updated information associated with the collection based on the user input associated with editing the information associated with the collection,
the updated information associated with the collection including a file with a second set of resource identifiers;

provide an import user interface associated with concurrently importing the second set of resource identifiers to the collection;

provide the updated information associated with the collection to permit the updated information associated with the collection to be provided for display to another user;

receive, via an input element of the one or more input elements associated with another sorting the display of the information associated with the collection, information associated with the other sorting the display of the updated information associated with the collection;

update, for display to the user, the collection user interface based on the received information associated with the other sorting the display of the updated information associated with the collection; and store the information associated with the updated collection user interface and the information associated with the collection user interface, the updated collection user interface associated with the other sorting being provided for presentation to the user, and the collection user interface associated with the sorting being provided for presentation to the other users.

9. The device of claim 8, where the collection user interface further includes an input element associated with adding another resource identifier to the collection, and where the one or more processors are further to:

receive, via the input element associated with the adding the other resource identifier to the collection, other resource information associated with the other resource identifier; and provide the other resource information associated with the other resource identifier such that the other resource identifier and the other resource information are stored in associated with the collection.

10. The device of claim 8, where the collection user interface further includes an input element associated with embedding the collection in a web page, and where the one or more processors are further to:

receive, via the input element associated with embedding the collection in the web page, an indication to embed the collection in the web page; and provide the information associated with the collection based on the indication, the information associated with the collection being provided such that the collection is embedded in the web page.

11. The device of claim 8, where the one or more processors, when receiving the user input associated with editing the information associated with the collection, are to:

identify, based on the user input, a resource stored or accessible by the device;

cause an additional resource identifier, corresponding to the resource, to be generated; and cause the additional resource identifier to be added to the collection.

12. The device of claim 8, where the collection user interface further includes an input element associated with modifying the display of the information associated with the collection within the collection user interface, and where the one or more processors are further to:

receive, via the input element associated with modifying the display of the information associated with the collection, information associated with modifying the display of the information associated with the collection; and update the collection user interface based on the information associated with modifying the display of the information associated with the collection.

13. The device of claim 8, where the one or more processors, when receiving the user input associated with editing the information associated with the collection, are to:

receive a file including additional resource information associated with multiple additional resource identifiers;

provide, for display, a user interface associated with adding the multiple additional resource identifiers to the collection; and receive the user input associated with the editing the information associated with the collection via the user interface.

14. The device of claim 8, where the one or more processors are further to:

determine reporting information associated with the collection, the reporting information including details associated with displays or accesses of the collection; and provide the reporting information, associated with the collection, for display to the user.

15. A non-transitory computer-readable medium storing instructions, the instructions comprising:

one or more instructions that, when executed by one or more processors, cause the one or more processors to:

receive information associated with a collection including a first set of uniform resource locators (URLs) and at least two of:

a set of titles associated with the first set of URLs, a set of images associated with the first set of URLs, a set of descriptions associated with the first set of URLs, or a set of tags associated with the first set of URLs;

provide, for display to a user, a collection user interface that includes the information associated with the collection and one or more input elements associated with editing the information associated with the collection, and one or more input elements associated with sorting a display of the information associated with the collection, the user being one of a set of users associated with the collection;

determine, based on user input via the one or more input elements associated with editing the information associated with the collection, updated information associated with the collection, the updated information associated with the collection including a file with a second set of URLs; and provide, for display to the user, an import user interface associated with concurrently importing the second set of URLs to the collection;

provide the updated information associated with the collection to allow the updated information associated with the collection to be provided for display to another user;

receive, via an input element of the one or more input elements associated with another sorting the display of the information associated with the collection, information associated with the other sorting the display of the updated information associated with the collection;

update, for display to the user, the collection user interface based on the received information associated with the other sorting the display of the updated information associated with the collection; and store information associated with the updated collection user interface and information associated with the collection user interface, the updated collection user interface associated with the other sorting being provided for presentation to the user, and the collection user interface associated with the sorting being provided for presentation to the other users.

16. The non-transitory computer-readable medium of claim 15, where the information associated with the collection includes the set of tags associated with the first set of URLs, and where the one or more instructions, when executed by the one or more processors, further cause the one or more processors to:

detect a user interaction associated with a tag of the set of tags, the tag being associated with a first subset of the first set of URLs and not being associated with a second subset of the first set of URLs; and update the collection user interface based on the user interaction associated with the tag, the collection user interface being updated to include information associated with the first subset of the first set of URLs, and to not include information associated with the second subset of the first set of URLs.

17. The non-transitory computer-readable medium of claim 15, where the collection user interface further includes an input element associated with commenting on the collection, and where the one or more instructions, that cause the one or more processors to determine the updated information associated with the collection, cause the one or more processors to:

receive, via the input element associated with commenting on the collection, a user comment associated with the collection; and determine the updated information associated with the collection based on the user comment associated with the collection.

18. The non-transitory computer-readable medium of claim 15, where the one or more instructions, that cause the one or more processors to determine the updated information associated with the collection, cause the one or more processors to:

identify a resource stored or accessible by a device;

cause an additional URL, corresponding to the resource, to be generated; and cause the additional URL to be added to the collection.

19. The non-transitory computer-readable medium of claim 15, where the one or more instructions, when executed by the one or more processors, further cause the one or more processors to:

determine reporting information associated with the collection, the reporting information including details associated with displays or accesses of the collection; and provide the reporting information, associated with the collection, for display to the user.

20. The non-transitory computer-readable medium of claim 15, where the one or more instructions, that cause the one or more processors to receive information associated with the other sorting the display causes the one or more processors to:

receive information sorted by at least one of:
a date,
popularity,
URL title,
an order specified by a creator or owner of the collection,
a quantity of accesses by other users, or
a frequency of access.

* * * * *